(12) United States Patent
Farrell

(10) Patent No.: US 7,520,658 B2
(45) Date of Patent: Apr. 21, 2009

(54) RINSEABLE SPLASH SHIELD AND METHOD OF USE

(75) Inventor: James J. Farrell, Orinda, CA (US)

(73) Assignee: f'REAL! Foods, LLC, Orinda, CA (US)

( * ) Notice: Subject to any disclaimer, the term of this patent is extended or adjusted under 35 U.S.C. 154(b) by 0 days.

(21) Appl. No.: 11/284,646

(22) Filed: Nov. 22, 2005

(65) Prior Publication Data

US 2006/0077756 A1     Apr. 13, 2006

Related U.S. Application Data

(62) Division of application No. 10/715,171, filed on Nov. 17, 2003.

(60) Provisional application No. 60/426,622, filed on Nov. 15, 2002.

(51) Int. Cl.
*B01F 13/00* (2006.01)
*B01F 15/00* (2006.01)

(52) U.S. Cl. .................. 366/197; 366/203; 366/207; 366/347

(58) Field of Classification Search ............... 366/203, 366/207, 199, 197, 347
See application file for complete search history.

(56) References Cited

U.S. PATENT DOCUMENTS

| | | | |
|---|---|---|---|
| 496,674 A | 5/1893 | Urbach | |
| 934,537 A | 9/1909 | Johnson | |
| 1,090,148 A | 3/1914 | Harr | 366/207 |
| 1,313,830 A | 8/1919 | Minsk | |
| 1,496,611 A | 6/1924 | Siegel | 366/207 |
| 1,560,826 A | 11/1925 | Kirschbraun | 366/168.1 |
| 1,847,226 A | 3/1932 | Ringwald | 366/207 |
| 1,911,202 A | 5/1933 | Nielsen | 366/207 |

(Continued)

FOREIGN PATENT DOCUMENTS

DE        2 158 002        5/1973

OTHER PUBLICATIONS

Product literature for Hamilton Beach Models 936 P and 908, entitled "Hamilton Beach Over 80 Years of Quality, Dependability & Service," Apr. 1992, 4 pages in length.

(Continued)

*Primary Examiner*—Tony G Soohoo
(74) *Attorney, Agent, or Firm*—Stallman & Pollock

(57) ABSTRACT

The present application describes a method for rinsing a splash shield. A vessel containing contents to be mixed is positioned in a mixing machine, and a splash shield is positioned over the opening of the vessel. After the material within the vessel is mixed by a mixing element, the splash shield is separated from the vessel and rinsed by a nozzle on the mixing machine. In another embodiment, a vessel containing contents to be mixed is positioned in a holder on a mixing machine, and a splash shield (which may or may not be rinseable) is positioned over the opening of the vessel. The contents of the vessel are mixed using a mixing element. During and/or after mixing, opposed relative movement of the mixing element and vessel may occur, creating an upward lifting force on the vessel. The weight of the shield is sufficient to overcome this upward lifting force on the vessel and thereby causes the vessel to remain seated in the holder.

11 Claims, 3 Drawing Sheets

U.S. PATENT DOCUMENTS

| | | | |
|---|---|---|---|
| 1,913,210 A | 6/1933 | Parker | 366/207 |
| 2,003,259 A | 5/1935 | Gilbert et al. | 366/207 |
| 2,012,486 A | 8/1935 | Strauss | 366/199 |
| 2,026,240 A | 12/1935 | Luxmore | 259/99 |
| 2,031,770 A | 2/1936 | Gilbert et al. | 366/199 |
| 2,072,691 A | 3/1937 | Stark | 99/60 |
| 2,115,809 A | 5/1938 | Goldman | 259/99 |
| 2,134,759 A | 11/1938 | Howlett | 220/231 |
| 2,667,423 A | 1/1954 | Simpson | 99/171 |
| 2,668,765 A | 2/1954 | Stimpson | 99/55 |
| 2,701,131 A | 2/1955 | Love | 259/126 |
| 2,863,776 A | 12/1958 | Lisher | 99/136 |
| 2,898,094 A | 8/1959 | O'Neill, Jr. | 259/116 |
| 2,941,885 A | 6/1960 | Tomlinson | 99/54 |
| 2,967,433 A | 1/1961 | Phillips | 74/16 |
| RE25,490 E * | 11/1963 | Stubler | 366/207 |
| 3,154,123 A | 10/1964 | Tomlinson | 146/68 |
| 3,171,635 A | 3/1965 | Haentjens et al. | 259/4 |
| 3,295,997 A | 1/1967 | Tomlinson et al. | 99/275 |
| 3,365,304 A | 1/1968 | Guterman et al. | 426/565 |
| 3,503,757 A | 3/1970 | Rubenstein | 99/136 |
| 3,514,080 A | 5/1970 | Price et al. | 259/19 |
| 3,647,472 A | 3/1972 | Speech et al. | 99/34 |
| 3,665,722 A | 5/1972 | Cornelius | 62/68 |
| 3,738,619 A | 6/1973 | Shirae | 259/108 |
| 3,865,353 A | 2/1975 | Fischer | 259/118 |
| 3,889,002 A | 6/1975 | Clausi et al. | 426/576 |
| 3,922,361 A | 11/1975 | Vann | 426/599 |
| 3,939,001 A | 2/1976 | Clausi et al. | 106/136 |
| 3,949,098 A | 4/1976 | Bangert | 426/324 |
| 4,096,893 A | 6/1978 | Harvey, Jr. et al. | 141/90 |
| 4,169,681 A | 10/1979 | Kato | 366/244 |
| 4,358,298 A | 11/1982 | Ratcliff | 55/185 |
| 4,434,186 A | 2/1984 | Desia et al. | 426/565 |
| 4,544,277 A | 10/1985 | Schnellmann | 366/78 |
| 4,547,076 A | 10/1985 | Maurer | 366/244 |
| 4,637,221 A | 1/1987 | Levine | 62/342 |
| 4,708,487 A | 11/1987 | Marshall | 366/206 |
| 4,708,489 A | 11/1987 | Carlson | 366/149 |
| 4,822,175 A * | 4/1989 | Barnard et al. | 366/347 |
| 4,828,866 A | 5/1989 | Wade et al. | 426/599 |
| 4,842,884 A | 6/1989 | Bookwalter et al. | 426/585 |
| 5,114,045 A | 5/1992 | Herpe | 222/105 |
| 5,145,250 A | 9/1992 | Planck et al. | 366/8 |
| 5,150,967 A | 9/1992 | Neilson et al. | 366/206 |
| 5,328,263 A | 7/1994 | Neilson | 366/254 |
| 5,439,289 A | 8/1995 | Neilson | 366/207 |
| 5,580,007 A | 12/1996 | Caviezel et al. | 241/199.12 |
| 5,599,103 A | 2/1997 | Linscott | 366/343 |
| 5,803,377 A | 9/1998 | Farrell | 241/36 |
| 5,962,060 A | 10/1999 | Farrell | 426/565 |
| 6,326,047 B1 | 12/2001 | Farrell | 426/524 |
| 6,453,803 B1 | 9/2002 | Sodeyama et al. | 99/348 |
| 6,474,862 B2 | 11/2002 | Farrell | 366/147 |

OTHER PUBLICATIONS

Arbuckle, "Ice Cream," 3rd Edition, (1977), pp. 54-55, 323-331.

* cited by examiner

RINSEABLE SPLASH SHIELD AND METHOD OF USE

PRIORITY

This application is a Divisional of U.S. patent application Ser. No. 10/715,171, filed Nov. 17, 2003, and claims the benefit of U.S. Provisional Application No. 60/426,622, filed Nov. 15, 2002.

FIELD OF THE INVENTION

The present invention relates generally to the field of machines for mixing liquids, and specifically to devices for preventing splashing of liquids during mixing.

BACKGROUND OF THE INVENTION

Preparation of certain foods and beverages can involve blending, whipping, stirring, etc. the food or beverage. This may be done using a rotary blade or mixer which is lowered into a container holding the food or beverage, or which is held in place as the container is advanced towards the rotary blade/mixer to move the container's contents into contact with the blade/mixer.

In Applicant's U.S. Pat. Nos. 6,474,862, 6,326,047 and 5,803,377 entitled APPARATUS AND METHOD FOR MAKING FROZEN DRINKS, the disclosures of which are incorporated herein by reference, methods for making frozen drinks are described. These patents describe a machine that allows a milkshake or other frozen drink to be quickly made from a block of ingredients pre-frozen into a serving cup. The frozen contents within the serving cup are broken into small frozen particles using a rotating blade, and blended with an added liquid also using the rotating blade.

According to the patents, when a milkshake or other frozen drink is to be made, a serving cup containing the frozen block is positioned in a cup holder which forms a part of the frozen drink machine. A rotating blade is lowered into the cup and bores through the frozen substance in the cup, grinding it into small frozen particles. As the blade moves towards the bottom interior of the cup, milk, water, or another liquid is added to the cup and is blended into the frozen substance by the rotating blade. Alternatively, the rotating blade may be held at a fixed elevation, and the cup may be advanced towards the blade to move the cup's contents into contact with the blade. In either case, the cup and/or blade may be reciprocated to allow the full contents of the cup to be mixed.

During mixing, material can splash from the cup onto the drink machine and surrounding area. U.S. Pat. Nos. 5,328,263 and 5,439,289 (Neilson) each describe a separate, dedicated lid placement mechanism that positions a lid onto a cup so as to minimize such splashing when the contents of the cup are being mixed. U.S. Pat. No. 5,145,250 (Planck) describes a mixing device wherein the lid and mixing device move axially together until the lid makes contact with the receptacle, at which time springs keep the lid in contact with the receptacle as the mixing head travels further into the receptacle. In each case, there is potential for carryover of mixed ingredients from one batch to the next. In Planck, a disposable cover over the pressure plate of the lid is described. In Neilson U.S. Pat. No. 5,439,289 a provision for a releasable lid connector means is claimed to enable cleaning of the lid remotely from the mixing device. It is further desirable, however, to provide a drink mixer having a splash shield that may not only be located on the cup to avoid splashing during mixing, but that may also be automatically rinsed in place following mixing.

SUMMARY OF THE INVENTION

The present application describes a method for rinsing a splash shield. According to the disclosed method, a vessel containing contents to be mixed is positioned in a mixing machine, and a splash shield is positioned over the opening of the vessel. After the material within the vessel is mixed by a mixing element, the splash shield is separated from the vessel and rinsed by a nozzle on the mixing machine.

In another embodiment, a vessel containing contents to be mixed is positioned in a holder on a mixing machine, and a splash shield (which may or may not be rinseable) is positioned over the opening of the vessel. The contents of the vessel are mixed using a mixing element. During and/or after mixing, opposed relative movement of the mixing element and vessel may occur, creating an upward lifting force on the vessel. The weight of the shield is sufficient to overcome this upward lifting force on the vessel and thereby causes the vessel to remain seated in the holder

DETAILED DESCRIPTION OF THE DRAWINGS

Figure 1:
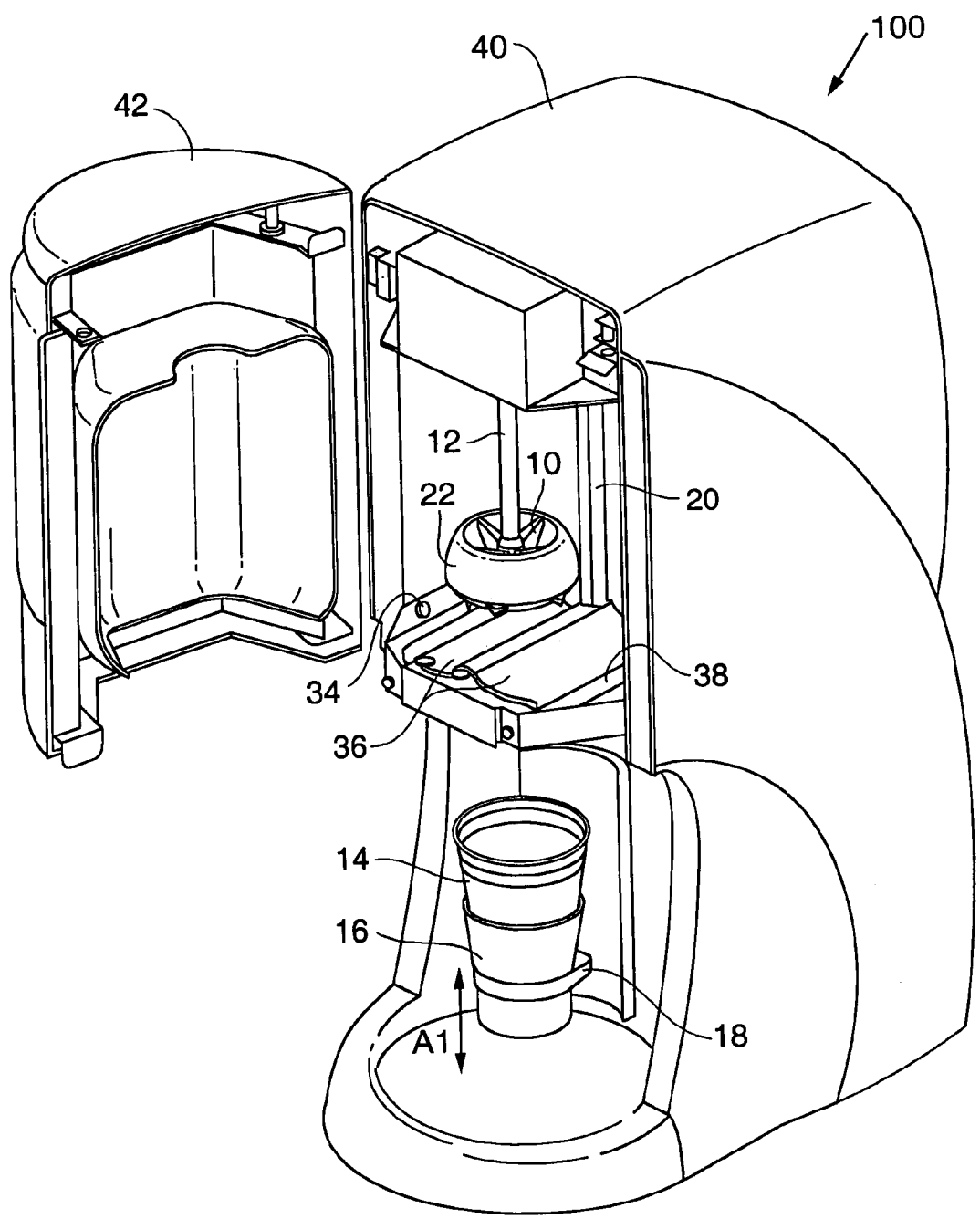
FIG. 1 is a top perspective view of a drink machine having a rinseable splash shield.

Referring to FIG. 1, the splash shield disclosed in this application is preferably provided as a component of a mixing/blending machine 100 that uses a rotating blade to mix/blend the contents within a cup or other vessel. Machine 100 may be a machine such as the f'REAL! Self-Serve Milkshake Blender available from f'REAL! Foods LLC, 37 Avenida de Orinda, Orinda, Calif., which is particularly useful for mixing/blending drinks such as frozen milkshakes, coffee drinks, or smoothies. However, it should be appreciated that the rinseable shield may be suitable for use on other types of machines for mixing and/or blending various materials, including powders, slurries and other types of liquids.

Machine 100 includes a mixing blade 10 carried on an elongate shaft 12. Mixing blade 10 is rotatable by means of a motor (not shown) and is designed to bore through the frozen substance in a cup 14. As described in greater detail in Applicants U.S. Pat. Nos. 6,474,862, 6,326,047 and 5,803,377, cup 14 is preferably a serving cup within which milkshake or other frozen drink ingredients have been pre-frozen into a block. A cup holder 16 supports the cup and is preferably moveable as indicated by arrow Al in FIG. 1, to cause the mixing blade to blend the frozen drink in the cup. Although movement of the holder 16 can be achieved in various ways, in the FIG. 1 embodiment the cup holder 16 is mounted to a carriage 18 that is moveable along a vertical rail 20 by means of a motor and lead screw assembly (not shown) disposed within the machine 100. Mixing blade 10 is rotatable by means of a motor (not shown) and is designed to bore through the frozen substance in the cup. As described in Applicant's prior patents, water, milk or another liquid is added to the cup for blending with the frozen substance, which is broken up into small frozen particles by the boring blade 10. The added liquid may be directed into the cup from above, such as through a fluid outlet oriented adjacent to the shaft.

As discussed, during mixing, the cup 14 is preferably reciprocated by cup holder 16 as indicated by arrow A1 in FIG. 1, to cause the rotating blade 10 to pass through the contents of the cup one or more times Obviously, the blade 10 may include a second motor for moving the shaft 12 longitudinally, in which case the need for the motor associated with cup holder 16 would be eliminated.

Figure 2:
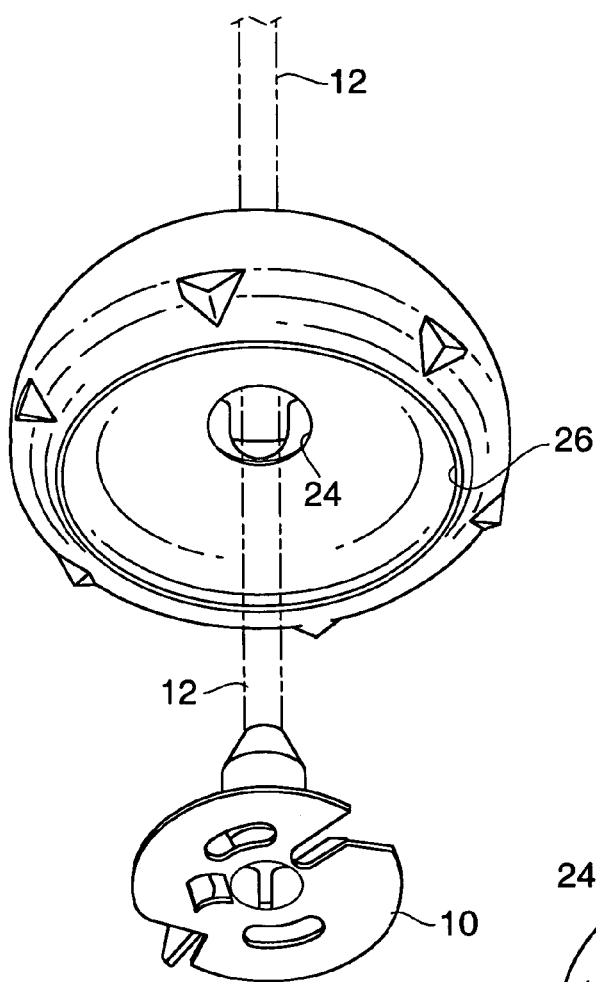
FIG. 2 is a bottom perspective view showing a splash shield, shaft and mixing blade of FIG. 1, with the splash shield displaced from the mixing blade. For clarity, the portion of the shaft passing through the splash shield is not shown.
Figure 3:
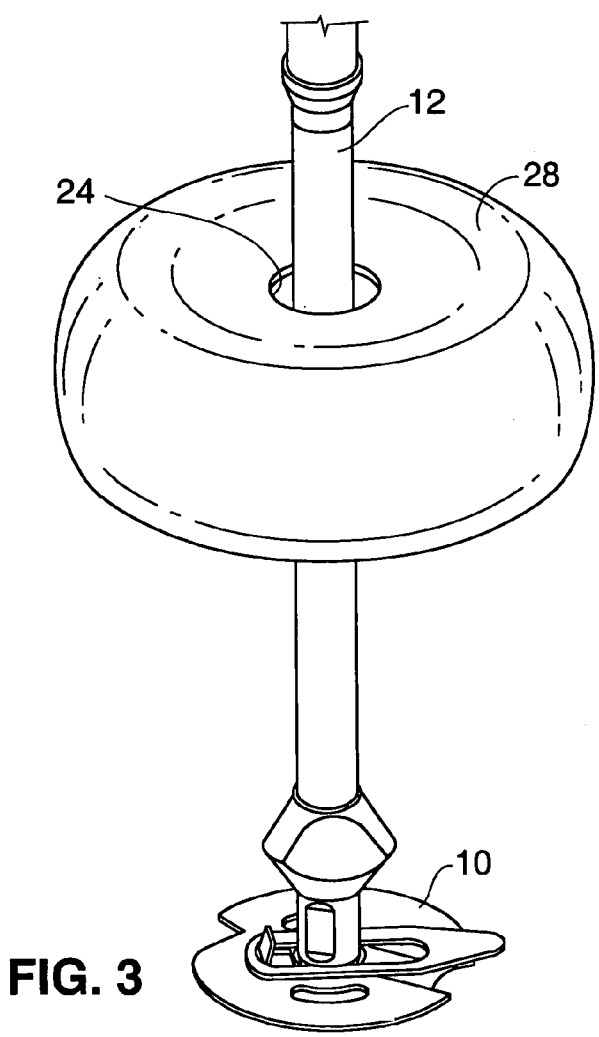
FIG. 3 is top perspective view of the components shown in FIG. 2.

Referring to FIGS. 2 and 3, splash shield 22 is preferably comprised of a lid proportioned to seat along the upper edge of cup 14. The shield includes an upper opening 24 and a larger lower opening 26. Shaft 12 extends through the openings 24, 26 such that the mixing blade 10 is positioned beneath the shield 22.

Shield 22 may have a dome-shaped configuration as shown, although other configurations would be equally suitable. As shown in FIG. 3, a wall 28 tapers inwardly from the uppermost surface of the shield 22 down to the upper opening 24. Spaced apart ribs 30 are positioned along the wall 28 and function to contact a tapered portion 32 of the machine's mixing shaft (as shown in FIG. 1) when the shield 22 is lowered relative to the shaft. When the shield is raised relative to the shaft, the shield 22 and tapered portion 32 separate as in FIG. 2.

Referring again to FIG. 1, one or more nozzles 34 (only one is shown) are provided for directing rinsing fluid into the interior of shield 22. Nozzles 34 are coupled to one or more sources of rinse fluid, such as water (preferably hot or warm water) and/or sanitizing solution such as a quaternary ammonium sanitizer solution.

Machine 100 includes a pair of automatic hinged doors 36 along the path of travel of holder 16. A fluid trough 38 for receiving rinse water shed from the shield surrounds the hinged doors. A drain line (not shown) is fluidly coupled to the trough, and the trough includes gradients arranged to direct water towards the drain line. The trough 38, rinse nozzle 34, shaft 12, shield 22 and mixing element are preferably positioned within an enclosure 40 having an access door 42 (as shown in FIG. 1).

A controller (not shown) within the machine controls operation of the motors for the cup holder, blade and hinged doors, as well as the liquid dispense and rinsing functions.

Operation

Figure 4:
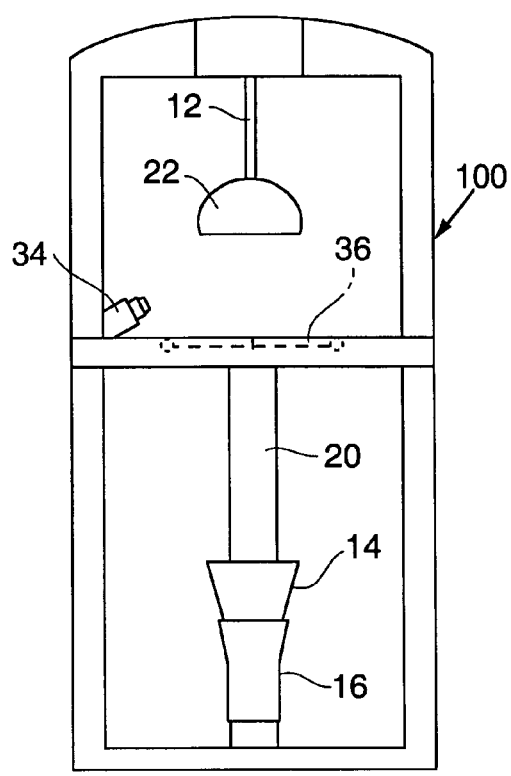
FIGS. 4 through 7 are a sequence of front elevation views of the drink machine of FIG. 1 illustrating use of the rinseable splash shield.
Figure 5:
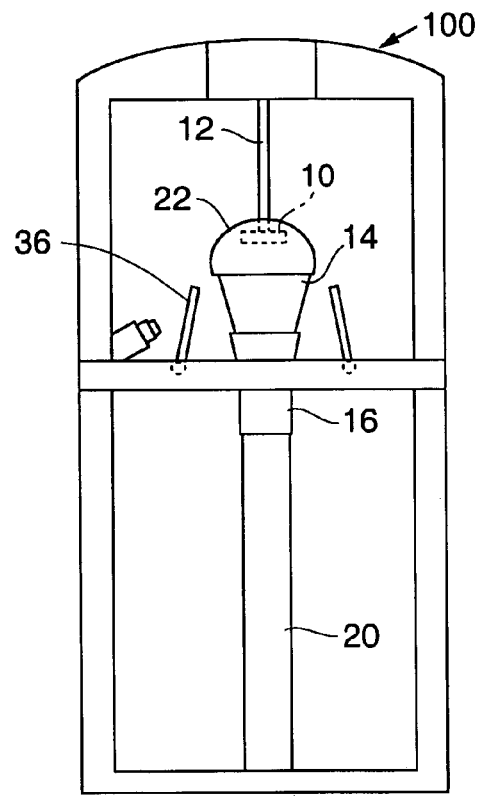
Figure 6:
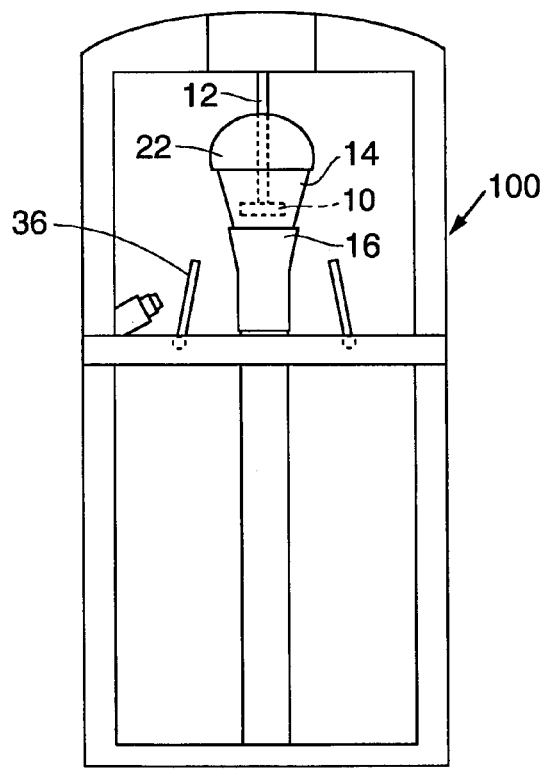

FIGS. 4-7 are a sequence of drawings that illustrate operation of the rinseable splash shield. First, a cup 14 containing frozen ingredients is positioned in cup holder 16 as shown in FIG. 4 and the user depresses a "start" button (not shown) on the exterior of the machine 100. Next (FIG. 5), hinged doors 36 are opened and holder 16 is moved upwardly along rail 20, thereby moving the upper edge of cup 14 into contact with the shield 22. Continued upward movement of the holder 16 causes the shield 22 to be raised upwardly on the shaft, and the tapered section 32 of the shaft 12 to separate from ribs 30 of the shield 22, as the cup 14 moves up around the blade 10, as shown in FIG. 6. Rotation of the blade is activated (or may be activated at an earlier stage), and water, milk or other fluid may be directed into the cup as described in Applicant's earlier patents, causing the frozen beverage to be made. During mixing/blending the holder 16 (or the blade) may be reciprocated to allow the blade to pass through the full contents of the cup more than one time.

It should be noted that the shield 22 may be weighted to ensure a good seal with the cup. This eliminates the need for springs, as disclosed in Plank U.S. Pat. No. 5,145,250, or some other mechanism such as those described in Neilson U.S. Pat. Nos. 5,328,263 and 5,439,289, to hold the shield in position during mixing. Weighting the shield is of further advantage if it is heavy enough to create sufficient downward force on the cup to overcome any upward force created by the mixing blade being moved upwardly in the cup. The mixing blade can create such upward force as the mixing blade moves upwardly in the cup, imparting an upward force on the cup as a result of suction force or the viscous nature of the product being mixed in the cup. This can occur when the cup is lowered by the holder during mixing (i.e. when the cup is reciprocated to cause the mixing blade to pass through the cup's contents several times) and/or when the cup is lowered away from the blade after blending/mixing. Making the weight of the shield sufficient to overcome this upward lifting force on the cup causes the cup to remain seated in the cup holder without any other mechanical means of retaining it in the cup holder, such as clamping or gripping mechanisms or the springs or lid placement and retention mechanisms previously described. In one embodiment, the shield may be a cast stainless steel lid having a weight of approximately 5 lbs. It should be noted that a weighted splash shield may be provided even if the rinsing feature is not present.

Once the beverage is made, the cup holder 16 is lowered and thereby moves the cup 14 downwardly away from the blade. The descending cup carries the shield 22 downwardly until the ribs 30 of the shield engage tapered portion 32 of the shaft 12. At this point, the cup 14 separates from the shield 22 and is moved by the holder 16 to the position shown in FIG. 4. The cup may then be removed from the drink machine 100.

Figure 7:
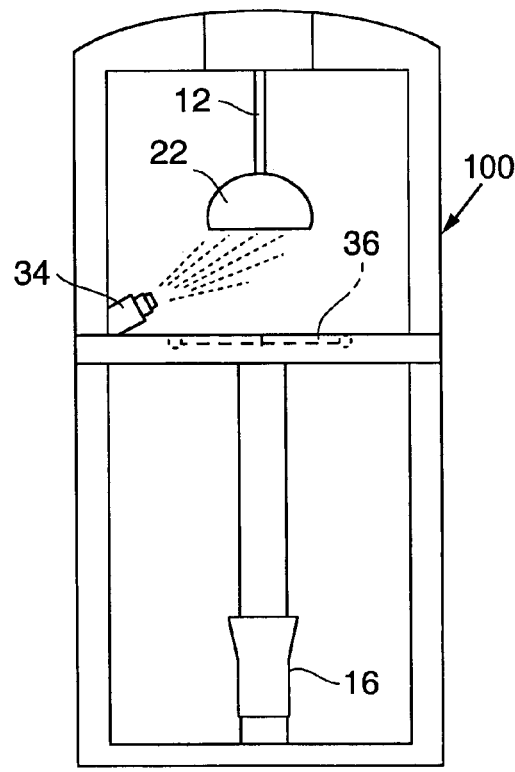

Next, the hinged doors 36 are closed and rinse fluid is directed onto the shield 22 using nozzle 34 as shown in FIG. 7. If desired, the shaft 12 may be rotated during and after rinsing. Given the weight of the splash shield and the contact between ribs 30 and tapered section 32 on the shaft, rotating the shaft 12 rotates the splash shield as well, thus allowing the rinse water to be spun off of the shield. Rotation may be of particular advantage if a single nozzle 34 is used for rinsing, since it allows the full interior of the shield 22 to be exposed to the fluid spray from the nozzle. The shield, blade and closed doors 36 shed the rinse fluid into trough 38, which then directs the water out of the machine via the drain line.

I claim:

1. A mixing machine for mixing a liquid contained in a vessel having an opening, the mixing machine comprising:

a holder coupled to the mixing machine, the holder proportioned to receive a vessel;

a rotatable mixing element extendable through the opening into the vessel positioned in the holder, for mixing the contents of the vessel;

a motor operatively coupled to at least one of the holder and the mixing element to effect axial translation of the mixing element between first and second positions within the vessel, the mixing element positioned further from the opening when in the first position than when in the second position;

a shaft; and a splash shield slidable on the shaft between first and second positions, the splash shield in the second position positionable covering the opening of the vessel and being unrestrained against sliding movement on the shaft in a direction away from the opening, the splash shield having sufficient mass to retain the vessel within the holder during relative axial movement of the mixing element and vessel from the first position to the second position when liquid is present in the vessel.

2. The mixing machine of claim 1, wherein the mixing element is carried on the shaft, and wherein the holder is moveable relative to the mixing element to move the vessel in a first direction towards the mixing element and in a second direction away from the mixing element.

3. The mixing machine of claim 2, wherein movement of the vessel in the first direction positions the vessel in contact with the splash shield.

4. The mixing machine of claim 1, wherein the mixing element is carried by the shaft, and wherein the splash shield is engageable with a member on the shaft and is disengageable from the member in response to upward force by the vessel against the splash shield.

5. The mixing machine of claim 1, wherein the splash shield has a mass of approximately 5 lbs.

6. A method for retaining a vessel in a holder while mixing contents of the vessel, the method comprising the steps of:
   providing a vessel containing contents to be mixed, the vessel including an opening;
   further providing a mixing machine having a holder on the mixing machine for receiving the vessel, a rotatable mixing element extendable into the vessel for mixing the contents of the vessel, and a shield;
   positioning the vessel in the holder;
   positioning the shield in contact with the vessel to cover the opening of the vessel, the shield when contacting the vessel being unrestrained against upward movement away from the opening; and
   with the vessel positioned in the holder, using a motor to translate at least one of the mixing element and the holder such that the mixing element passes through the contents of the vessel, the mass of the splash shield preventing separation of the holder and the vessel during translation.

7. The method of claim 6, wherein the method further includes the step of rotating the mixing element to mix the contents of the vessel.

8. The method of claim 7 wherein translating the mixing element includes translating the mixing element while rotating the mixing element to mix the contents of the vessel.

9. The method of claim 6, wherein the method further includes containing a substantial portion of contents splashing from the vessel within the shield or vessel.

10. The method of claim 6, wherein the contents of the vessel are at least partially frozen.

11. The method of claim 6, wherein the contents comprise frozen milkshake ingredients.

\* \* \* \* \*